US008579351B2

(12) United States Patent
Takakura et al.

(10) Patent No.: US 8,579,351 B2
(45) Date of Patent: Nov. 12, 2013

(54) VEHICLE SEAT DEVICE

(75) Inventors: Masayuki Takakura, Wako (JP);
Kazutomo Isonaga, Wako (JP);
Toshihiko Tsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/203,563

(22) PCT Filed: Feb. 5, 2010

(86) PCT No.: PCT/JP2010/051700
§ 371 (c)(1),
(2), (4) Date: Aug. 26, 2011

(87) PCT Pub. No.: WO2010/098196
PCT Pub. Date: Sep. 2, 2010

(65) Prior Publication Data
US 2011/0304179 A1    Dec. 15, 2011

(30) Foreign Application Priority Data

Feb. 27, 2009    (JP) ................................ 2009-046324

(51) Int. Cl.
*B60N 2/04*    (2006.01)
(52) U.S. Cl.
USPC ........ 296/65.05; 297/234; 297/236; 297/334; 296/65.13; 296/65.09
(58) Field of Classification Search
USPC ......... 297/234, 235, 242, 249, 257, 331, 334, 297/336, 344.1; 296/65.05, 65.09
See application file for complete search history.

(56) References Cited

U.S. PATENT DOCUMENTS

| | | | | |
|---|---|---|---|---|
| 5,871,255 A * | 2/1999 | Harland et al. | ............... | 297/257 |
| 6,270,140 B1 * | 8/2001 | Opfer et al. | ................ | 296/65.03 |
| 6,394,525 B1 * | 5/2002 | Seibold | ....................... | 296/65.09 |
| 6,648,393 B1 * | 11/2003 | Milnar et al. | .............. | 296/65.11 |
| 6,955,386 B2 * | 10/2005 | Rhodes et al. | ............. | 296/65.09 |
| 6,962,384 B2 * | 11/2005 | Rhodes et al. | .................. | 296/66 |
| 7,229,117 B2 * | 6/2007 | Okuda et al. | .................... | 296/64 |
| 7,686,367 B2 * | 3/2010 | Neale | .............................. | 296/64 |
| 7,708,331 B2 * | 5/2010 | Yamasaki | .................. | 296/65.13 |
| 7,712,829 B2 * | 5/2010 | Park | ............................. | 297/234 |
| 2002/0021016 A1 * | 2/2002 | Bergquist et al. | ......... | 296/65.09 |
| 2005/0230996 A1 * | 10/2005 | Toyota et al. | ............. | 296/65.11 |
| 2006/0108822 A1 * | 5/2006 | Tame | ......................... | 296/65.11 |
| 2006/0220411 A1 * | 10/2006 | Pathak et al. | ............. | 296/65.11 |
| 2008/0238125 A1 * | 10/2008 | Mahaffy | ................... | 296/65.09 |
| 2009/0243325 A1 * | 10/2009 | Villeminey | ............... | 296/65.09 |

FOREIGN PATENT DOCUMENTS

| | | |
|---|---|---|
| JP | H05-26605 | 4/1993 |
| JP | 11-245695 | 9/1999 |
| JP | 2009-029353 | 2/2009 |

* cited by examiner

*Primary Examiner* — David Dunn
*Assistant Examiner* — Richard Lowry
(74) *Attorney, Agent, or Firm* — Rankin, Hill & Clark LLP

(57) ABSTRACT

A vehicle seat device capable of providing a space in which a large sized load can be disposed. A seat device is provided with a left rear seat and a right rear seat arranged next to each other in the vehicle width direction, and also with a left front movement device for moving the left rear seat to a left foot space located in front of the left rear seat. The left rear seat having been moved to the left foot space is moved through a lateral slide rail up to a right foot space located in front of the right rear seat.

4 Claims, 14 Drawing Sheets

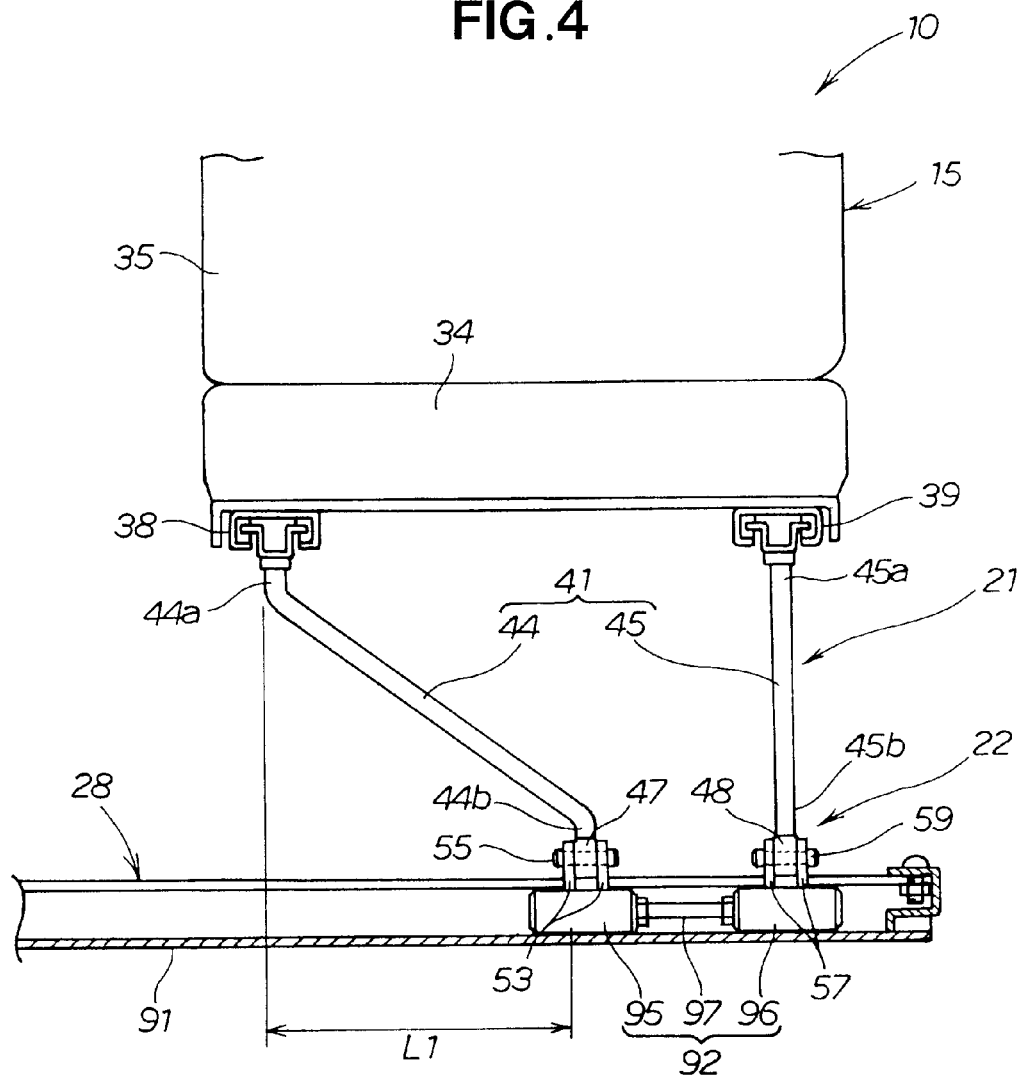

VEHICLE SEAT DEVICE

TECHNICAL FIELD

The present invention relates to a vehicle seat device wherein first and second seats are arranged next to each other in a vehicle width direction and the first seat is movable by a front movement means into a foot space in front of the seats.

BACKGROUND ART

Vehicle seat devices of such description include those in which a support leg for supporting a seat cushion is mounted on the vehicle body floor, and the seat cushion is mounted on the support leg so as to be capable of swinging as well as to be capable of sliding in the vehicle width direction relative to the support leg. According to a vehicle seat device of such description, it is possible to slide the seat cushion in the vehicle width direction while in a position of being collapsed forward (i.e., flipped up) with respect to the vehicle body, and provide room in which a vehicle occupant can move (i.e., "walk through") in the longitudinal direction with respect to the vehicle body (e.g., see Patent Literature 1).

Also, vehicle seat devices include those in which a support leg for supporting a seat cushion is mounted on the vehicle body floor so as to be capable of swinging as well as to be capable of sliding in the vehicle width direction relative to the vehicle body floor. According to a vehicle seat device of such description, it is possible to slide the seat cushion in the vehicle width direction in a position of being collapsed forward (i.e., flipped up) with respect to the vehicle body, and provide room in which a vehicle occupant can move (i.e., "walk through") in the longitudinal direction with respect to the vehicle body (e.g., see Patent Literature 2).

Thus, according to the vehicle seat devices of Patent Literatures 1 and 2, it is possible to slide the seat cushion in the vehicle width direction and thereby provide walk-through room. However, it is difficult, according to the techniques of Patent Literatures 1 and 2, to provide room (i.e., a space) in which a large-sized load can be disposed in a state in which the seat cushion has been moved in the vehicle width direction.

Prior Art Literature

Patent Literature
Patent Literature 1: Japanese Utility Model Application Laid-Open Publication No. H05-26605
Patent Literature 2: Japanese Patent Application Laid-Open Publication No. H11-5477

SUMMARY OF INVENTION

Technical Problem

An object of the present invention is to provide a vehicle seat device that can provide a space in which a large-sized load can be disposed.

Solution to Problem

According to an aspect of the present invention, there is provided a vehicle seat device comprising: first and second seats arranged next to each other in a vehicle width direction; front movement means for moving the first seat to a foot space positioned in front of the first seat; and vehicle-width-direction movement means for allowing the first seat, which has moved into the foot space, to move to a foot space positioned in front of the second seat.

It is preferred that the vehicle-width-direction movement means comprise a slide rail extending in the vehicle width direction from the foot space of the first seat to the foot space of the second seat, and the seat device have a first support leg for supporting the first seat, the first support leg being supported by the slide rail so as to be capable of moving in the vehicle width direction, the first support leg supporting the first seat so as to be capable of frontward rotation with respect to a vehicle body floor.

Desirably, the seat device has a second support leg for supporting the second seat so as to be capable of frontward rotation with respect to the vehicle body floor, the second support leg being supported by the slide rail so as to be capable of moving in the vehicle width direction.

Advantageous Effects of Invention

The vehicle seat device comprises front movement means for moving the first seat to the foot space, and vehicle-width-direction movement means for allowing the first seat that has moved into the foot space to move into the foot space of the second seat. It is thereby possible to move the first seat into the foot space, and move the first seat that has moved into the foot space to the front of the second seat.

Moving the first seat to the front of the second seat makes it possible to remove the first seat from a space in which the first seat is arranged in a seating state, or from the foot space of the first seat. It is thereby possible to combine the space in which the first seat is arranged in the seating state with the foot space of the first seat. A large load space can thereby be provided, and a bicycle, a motorcycle, or a similar large-sized load can be disposed in the large load space.

Also, in the present invention, a slide rail is used as the vehicle-width-direction movement means, and the first support leg is supported on the slide rail so as to be capable of movement. The first seat is supported by the first support leg so as to be capable of frontward rotation with respect to the vehicle body floor. Thus, it is possible to provide a load space, in which a large-sized load can be disposed, using a simple configuration comprising only the slide rail and the first support leg.

Also, the present invention comprises a second support leg for supporting the second seat so as to be capable of frontward rotation with respect to the vehicle body floor. The second support leg is supported by the slide rail so as to be capable of movement. It is thereby possible, as with the first seat, to move the second seat to the foot space, and to move the second seat that has moved into the foot space to the front of the first seat.

Moving the second seat to the front of the first seat makes it possible to remove the second seat from a space in which the second seat is arranged in a seating state, or from the foot space of the second seat. It is thereby possible to combine the space in which the second seat is arranged in the seating state with the foot space of the second seat. Combining these spaces makes it possible to provide a large load space, and to dispose a bicycle, a motorcycle, or a similar large-sized load in the large load space.

Thus, it is possible to select, according to the intended use of the vehicle, between an instance in which the first seat is removed and a load space is provided, and an instance in which the second seat is removed and a load space is provided. As a result, there is increased freedom in regard to the layout for providing a load space, and convenience can be improved.

The first support leg and the second support leg are supported by a common slide rail. It thereby becomes possible to reduce the number of slide rails, provide a large load space using a simple configuration, and increase the freedom in regard to the layout when providing a large load space.

BRIEF DESCRIPTION OF DRAWINGS

FIG. 4 is a front elevational view showing in cross-section a part of a left rear seat of the vehicle seat device of FIG. 3;

DESCRIPTION OF EMBODIMENTS

Certain preferred embodiments of the present invention will now be described with reference to the accompanying drawings.

First Embodiment

Figure 1:
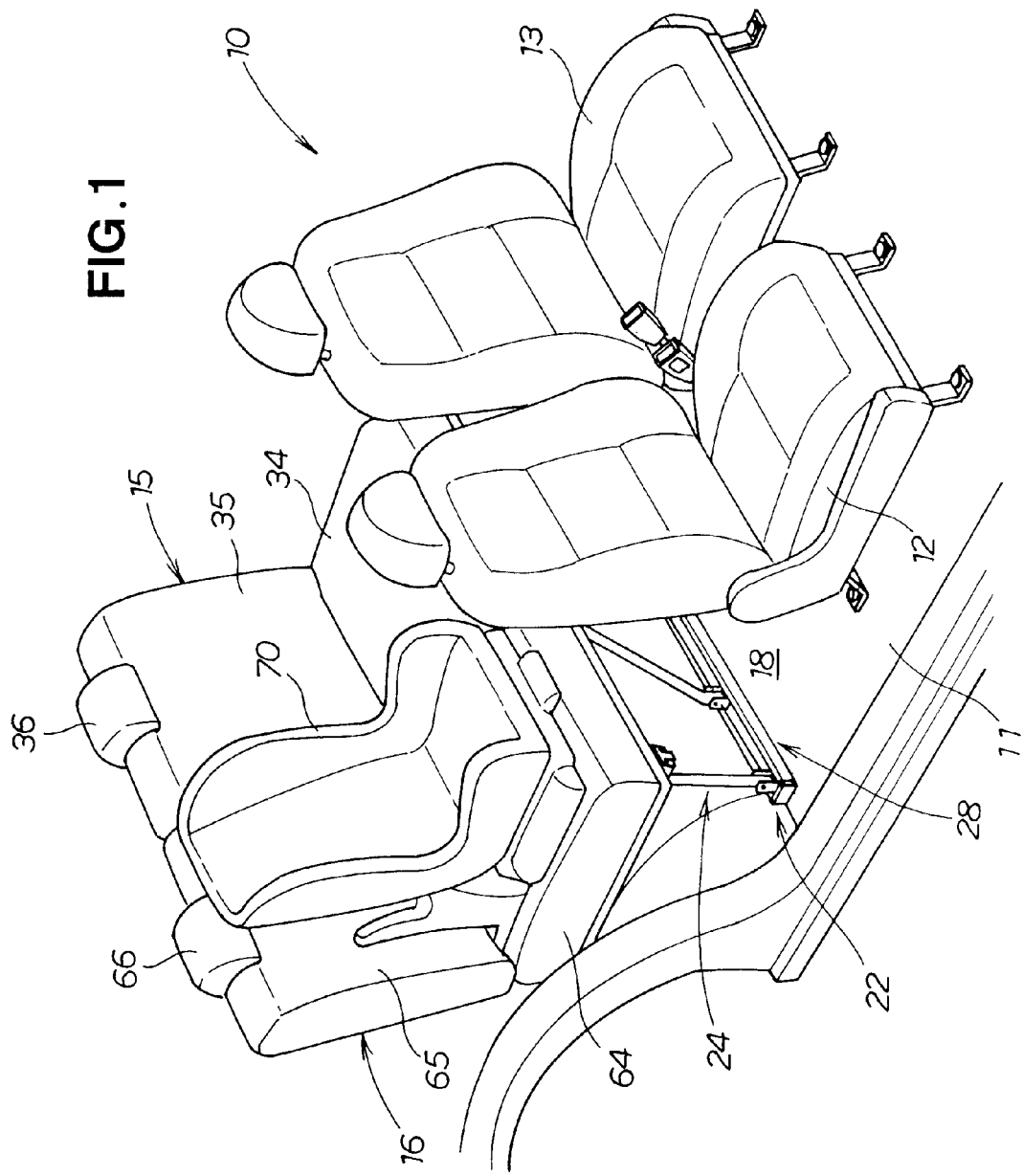
FIG. 1 is a perspective view illustrating a vehicle seat device according to a first embodiment of the present invention.
Figure 2:
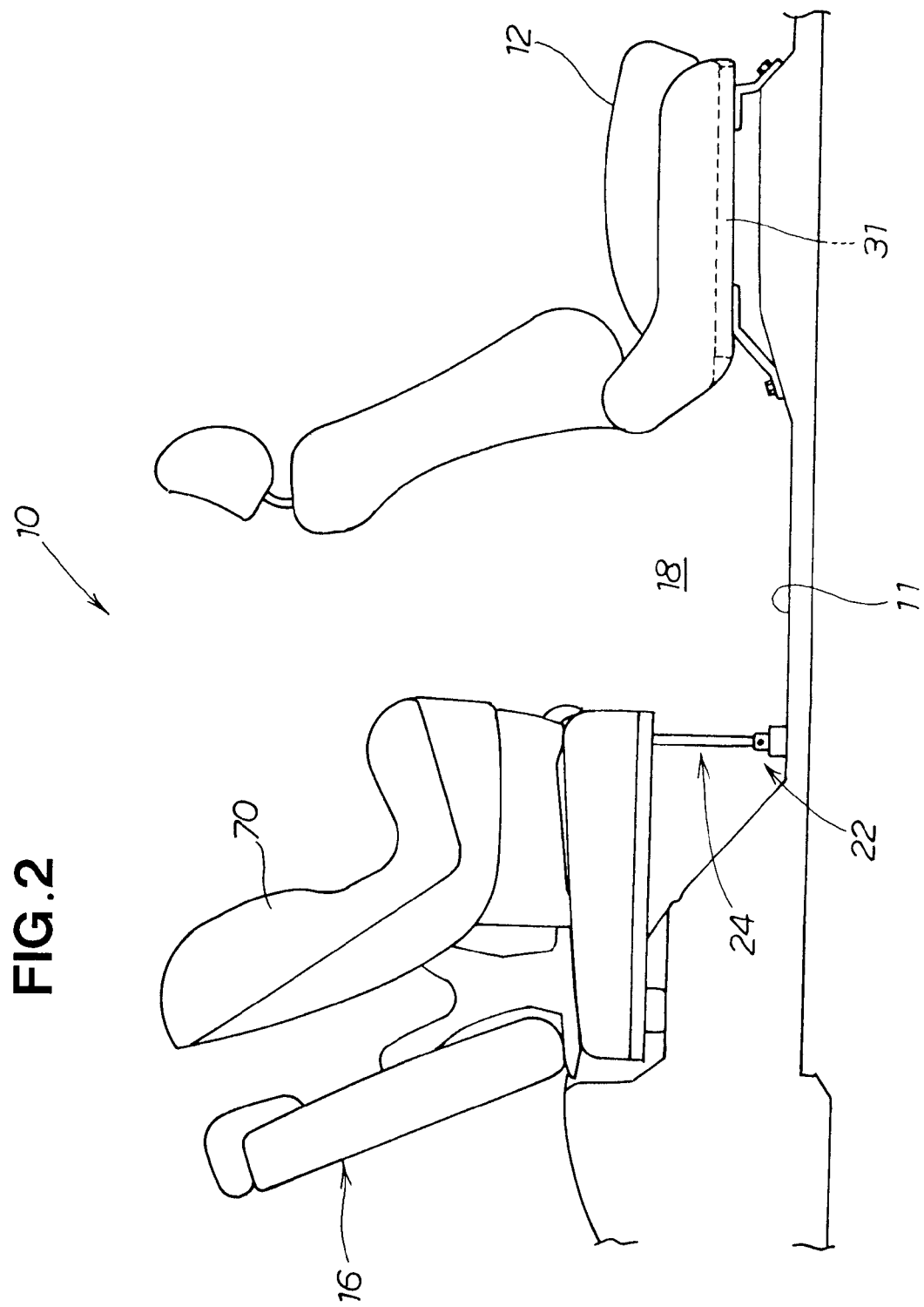
FIG. 2 is a side elevational view showing a vehicle seat of FIG. 1.

As shown in FIGS. 1 and 2, a vehicle seat device 10 according to a first embodiment comprises a driver seat 12 provided to a vehicle body floor (floor panel) 11; a passenger seat 13 provided adjacent to the driver seat 12 in the vehicle-body-width direction; a left rear seat (first seat) 15 provided behind the passenger seat 13; and a right rear seat (second seat) 16 provided behind the driver seat 12.

A slide door opens/closes, in the longitudinal direction with respect to the vehicle body, a side opening formed on a side part of the vehicle body at a position corresponding to the position of the side part of each of the left rear seat 15 and the right rear seat 16. A person embarking or disembarking opens the slide door and embarks or disembarks from the left and right rear seats 15, 16 through the side opening. A load compartment is formed behind the left rear seat 15 and the right rear seat 16. A tail gate for opening/closing a rear opening is provided to the load compartment. The tail gate is opened and load is disposed in the load compartment through the rear opening.

Figure 3:
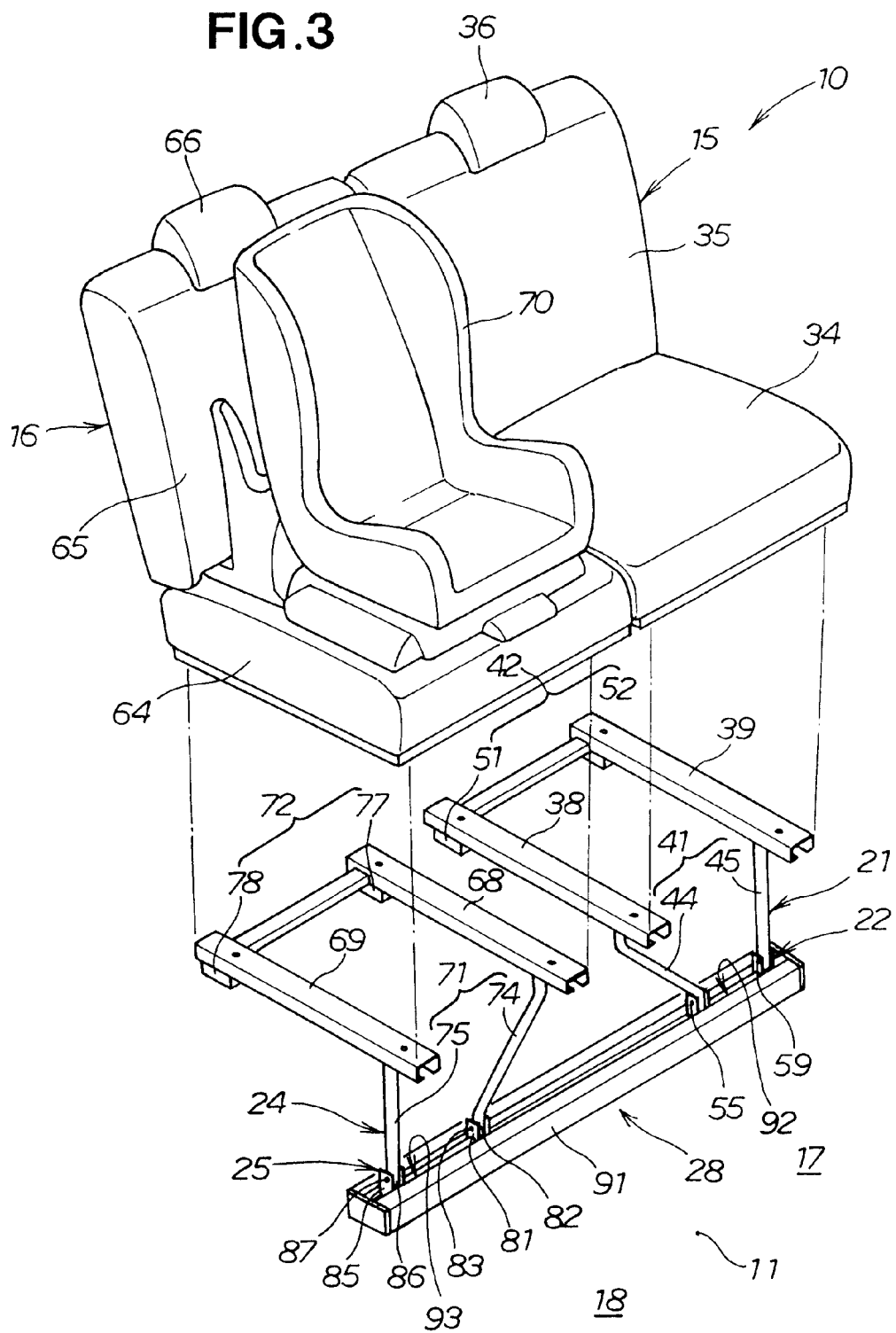
FIG. 3 is an exploded perspective view showing vehicle seats according to the first embodiment.

As shown in FIGS. 3, 4, the vehicle seat device 10 comprises a left support leg 21 for supporting the left rear seat 15; left front movement means (front movement means) 22 for supporting the left rear seat 15 so as to be capable of forward movement with respect to the vehicle body; a right support leg 24 for supporting the right rear seat 16; right front movement means (front movement means) 25 for supporting the right rear seat 16 so as to be capable of forward movement with respect to the vehicle body; and a lateral slide rail (vehicle-width-direction movement means) 28 for supporting the left rear seat 15 and the right rear seat 16 so as to be capable of sliding in the vehicle width direction.

The driver seat 12 shown in FIG. 2 is supported by the vehicle body floor 11, with inner and outer slide rails 31 interposed therebetween, so as to be capable of sliding in the longitudinal direction with respect to the vehicle body. As with the driver seat 12, the passenger seat 13 shown in FIG. 1 is supported by the vehicle body floor 11, with inner and outer slide rails (not shown) interposed therebetween, so as to be capable of sliding in the longitudinal direction with respect to the vehicle body.

As shown in FIG. 3, a left foot space 17 is formed in front of the left rear seat 15, i.e., between the left rear seat 15 and the passenger seat 13 (see FIG. 1). A right foot space 18 is formed in front of the right rear seat 16, i.e., between the right rear seat 16 and the driver seat 12 (see FIG. 1).

The left rear seat 15 comprises a left seat cushion 34 for seating a vehicle occupant; a left seat back 35 that can be tilted in the longitudinal direction with respect to the vehicle body, and that is provided on a rear part of the left seat cushion 34; a left headrest 36 provided to an upper part of the left seat back 35; and inner and outer left slide rails 38, 39 provided to a lower part of the left seat cushion 34.

The left support leg 21 comprises a left front support leg (first support leg) 41 provided to a front part of the inner and outer left slide rails 38, 39; and a left rear support leg 42 provided to a rear part of the inner and outer left slide rails 38, 39.

As shown in FIG. 4, the left front support leg 41 comprises an inner left front leg part 44 provided to a front part of the inner left slide rail 38 and an outer left front leg part 45 provided to a front part of the outer left slide rail 39.

The inner left front leg part 44 extends in a state of being inclined towards the outer side with respect to the vehicle body from an upper end part 44a to a lower end part 44b. An inner boss part 47 is formed at the lower end part 44b. The inner boss part 47 is connected to the left front movement means 22. With the inner left front leg part 44 being inclined towards the outer side with respect to the vehicle body from the upper end part 44a to the lower end part 44b, the lower end part 44b is provided further towards the outer side with respect to the vehicle body by a distance L1 relative to the upper end part 44a. Specifically, the inner boss part 47 is provided at substantially the center of the left rear seat 15 in the vehicle width direction.

The outer left front leg part 45 extends vertically from an upper end part 45a to a lower end part 45b. An outer boss part 48 is formed on the lower end part 45b. The outer boss part 48 is connected to the left front movement means 22.

The left rear support leg 42 shown in FIG. 3 comprises an inner left rear leg part 51 provided to a rear part of the inner left slide rail 38, and an outer left rear leg part 52 provided to a rear part of the outer left slide rail 39.

The inner left rear leg part 51 is detachably locked onto the vehicle body floor 11 when the left rear seat 15 is in a state of being arranged in a seating state. As with the inner left rear leg part 51, the outer left rear leg part 52 is detachably locked onto the vehicle body floor 11 when the left rear seat 15 is in a state of being arranged in a seating state.

The left front movement means 22 shown in FIG. 4 comprises a pair of inner brackets 53 provided upright on a left inner slider 95 described further below, with a predetermined spacing provided between the inner brackets 53; an inner left support pin 55 for pivotably supporting the inner boss part 47 arranged between the inner brackets 53; a pair of outer brackets 57 provided in a standing manner on a left outer slider 96 described further below, with a predetermined spacing provided between the outer brackets 57; and an outer left support pin 59 for pivotably supporting the outer boss part 48 arranged between the outer brackets 57. The outer left support pin 59 is provided coaxially in relation to the inner left support pin 55.

According to the left front movement means 22, with regards to the left front support leg 41, the left front support leg 41 (i.e., the inner left front leg part 44 and the outer left front leg part 45) of the rear seat 15 swings forward with respect to the vehicle body about the inner and outer left support pins 55, 59. Swinging the left front support leg 41 forward with respect to the vehicle body makes it possible to collapse (i.e., tumble) the left rear seat 15 into the left foot space 17 in front of the left rear seat 15 (see FIG. 3). In other words, the left rear seat 15 is supported by the left front support leg 41 so as to be capable of frontward rotation with respect to the vehicle body floor 11.

The right rear seat 16 shown in FIG. 3 is bilaterally symmetric with respect to the left rear seat 15. The right rear seat 16 comprises a right seat cushion 64 for seating a vehicle occupant; a right seat back 65 that can be tilted in the longitudinal direction with respect to the vehicle body, and that is provided on a rear part of the right seat cushion 64; a right headrest 66 provided to an upper end part of the right seat back 65; and inner and outer right slide rails 68, 69 provided to a lower part of the right seat cushion 64. A child seat 70 is mounted on the right rear seat 16.

The right support leg 24 is bilaterally symmetrical with respect to the left support leg 21. As with the left support leg 21, the right support leg 24 comprises a right front support leg (second support leg) 71 provided to a front part of the inner and outer right slide rails 68, 69; and a right rear support leg 72 provided to a rear part of the inner and outer right slide rails 68, 69.

The right front support leg 71 comprises an inner right front leg part 74 provided to a front part of the inner right slide rail 68; and an outer right front leg part 75 provided to a front part of the outer right slide rail 69. The inner right front leg part 74 is bilaterally symmetrical with respect to the inner left front leg part 44, and a description thereof will not be provided. The outer right front leg part 75 is bilaterally symmetrical with respect to the outer left front leg part 45, and a description thereof will not be provided.

The right rear support leg 72 comprises an inner right rear leg part 77 provided to a rear part of the inner right slide rail 68; and an outer right rear leg part 78 provided to a rear part of the outer right slide rail 69. The inner right rear leg part 77 is bilaterally symmetrical with respect to the inner left rear leg part 51, and a description thereof will not be provided. The outer right rear leg part 78 is bilaterally symmetrical with respect to the outer left rear leg part 52, and a description thereof will not be provided.

The right front movement means 25 is bilaterally symmetrical with respect to the left front movement means 22 shown in FIG. 4. The right front movement means 25 comprises a pair of inner brackets 81 provided upright on a right inner slider (not shown), with a predetermined spacing provided between the inner brackets 81; an inner right support pin 83 for pivotably supporting an inner boss part 82 of the inner right front leg part 74 arranged between the inner brackets 81; a pair of outer brackets 85 provided in a standing manner on a right outer slider (not shown), with a predetermined spacing provided between the outer brackets 85; and an outer right support pin 87 for pivotably supporting an outer boss part 86 of the outer right front leg part 75 arranged between the outer brackets 85. The outer right support pin 87 is provided coaxially in relation to the inner right support pin 83.

According to the right front movement means 25, the right front support leg 71 (i.e., the inner right front leg part 74 and the outer right front leg part 75) swings forward with respect to the vehicle body about the inner and outer right support pins 83, 87. Swinging the right front support leg 71 forward with respect to the vehicle body makes it possible to collapse (i.e., tumble) the right rear seat 16 into the right foot space 18 in front of the right rear seat 16. In other words, the right rear seat 16 is supported by the right front support leg 71 so as to be capable of frontward rotation with respect to the vehicle body floor 11.

The lateral slide rail 28 is a rail that extends in the vehicle width direction (i.e., laterally). The lateral slide rail 28 allows the left rear seat 15 in the left foot space 17 to slide into the right foot space 18, and allows the right rear seat 16 in the right foot space 18 to slide into the left foot space 17. The lateral slide rail 28 comprises a rail body 91 extending in the vehicle width direction; and left and right moving units 92, 93 provided within the rail body 91 so as to be capable of sliding (where only the left moving unit 92 is shown in detail in FIG. 4).

The rail body 91 is provided on the vehicle body floor 11 in a state of extending in the vehicle width direction from the left foot space 17 of the left rear seat 15 to the right foot space 18 of the right rear seat 16.

As shown in FIG. 4, the left moving unit 92 comprises the left inner slider 95 provided with the pair of inner brackets 53; the left outer slider 96 provided with the pair of outer brackets 57; and a left connection rod 97 for connecting the left inner slider 95 and the left outer slider 96 in a coaxial manner.

By providing the inner brackets 53 to the left inner slider 95, the inner left front leg part 44 is swingably supported by the left inner slider 95 with the inner brackets 53 and the inner left support pin 55 interposed therebetween. By providing the outer brackets 57 to the left outer slider 96, the outer left front leg part 45 is swingably supported by the left outer slider 96 with the outer brackets 57 and the outer left support pin 59 interposed therebetween.

The left inner slider 95 and the left outer slider 96 are provided within the rail body 91 so as to be capable of sliding. Therefore, sliding the left inner slider 95 and the left outer slider 96 (i.e., the left moving unit 92) along the rail body 91 makes it possible to move the left rear seat 15, along with the left front support leg 41, in the vehicle width direction. The left rear seat 15 can thereby move in the vehicle width direction to the right foot space 18 (see FIG. 3) in front of the right rear seat 16.

The right moving unit 93 shown in FIG. 3 is bilaterally symmetrical with respect to the left moving unit 92, and a detailed description will not be provided. As with the left moving unit 92, sliding the right moving unit 93 along the rail body 91 makes it possible to move the right rear seat 16, along with the right front support leg 71, in the vehicle width direction. The right rear seat 16 is thereby moved into the left foot space 17 (FIG. 3) in front of the left rear seat 15. The left moving unit 92 and the right moving unit 93 can be secured to the rail body 91 by a locking mechanism (not shown), at a desired position in the vehicle width direction in relation to the rail body 91.

As described above, according to the vehicle seat device 10, the lateral slide rail 28 is used as the vehicle-width-direction movement means, and the left support leg 21 and the right support leg 24 are supported on the lateral slide rail 28 so as to be capable of movement. The left rear seat 15 is supported by the left support leg 21 so as to be capable of frontward rotation with respect to the vehicle body floor 11, and the right rear seat 16 is supported by the right support leg 24 so as to be capable of frontward rotation with respect to the vehicle body floor 11.

Thus, a configuration is obtained in which the left rear seat 15 can be moved into the right foot space 18 and the right rear seat 16 can be moved into the left foot space 17 using a simple configuration comprising only the lateral slide rail 28 and the left and right support legs 21, 24. It is thereby possible, using a simple configuration, to provide a large load space in which a large-sized load can be disposed.

The left support leg 21 for supporting the left rear seat 15 and the right support leg 24 for supporting the right rear seat 16 are supported by a common lateral slide rail 28. It thereby becomes possible to reduce the number of the lateral slide rails 28, provide a large load space 106 (see FIG. 5G) using a simple configuration, and provide a large load space 106.

Next, a description will be given for an example in which the left rear seat 15 is moved into the right foot space 18, with reference to FIGS. 5A through 5G.

Figure 5A:
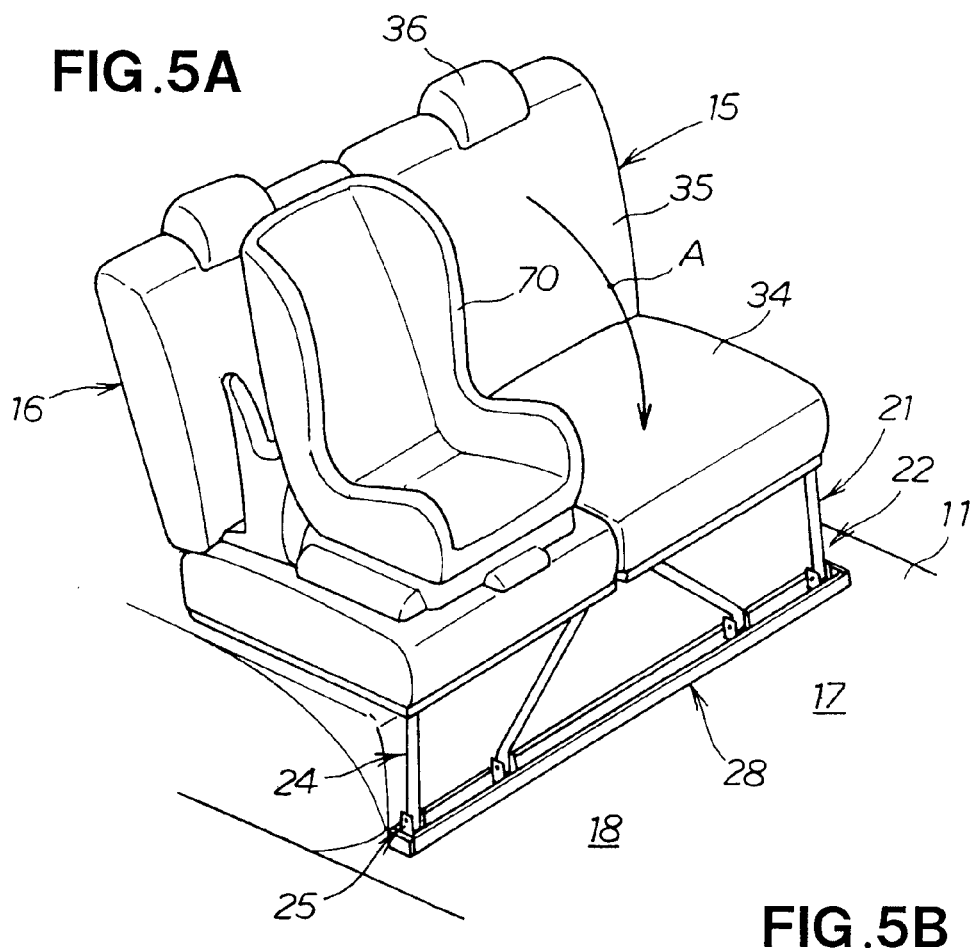
FIG. 5A is a perspective view showing the left and right rear seats.

As shown in FIG. 5A, the left seat back 35 of the left rear seat 15 is tilted onto the left seat cushion 34 as indicated by arrow A.

Figure 5B:
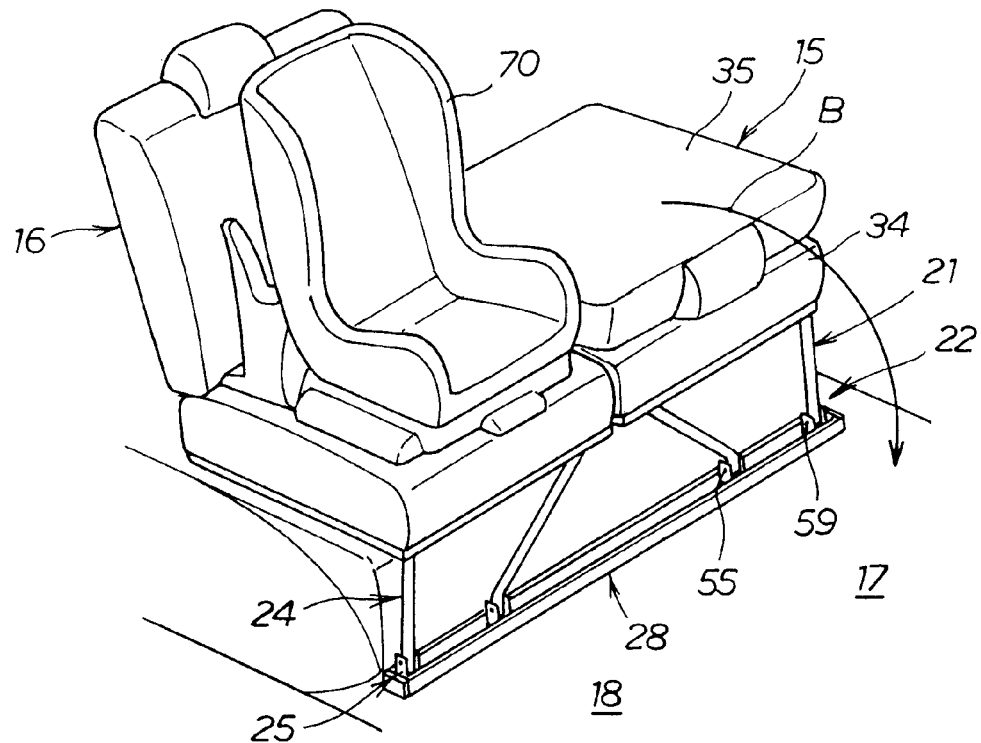
FIG. 5B is a perspective view showing the left rear seat with its seat back collapsed from the state of FIG. 5A.

As shown in FIG. 5B, the left seat back 35 is folded down onto the left seat cushion 34. The left rear seat 15 having the left seat back 35 folded down is rotated (i.e., tumbled) into the left foot space 17 about the inner and outer left support pins 55, 59 as indicated by arrow B.

Figure 5C:
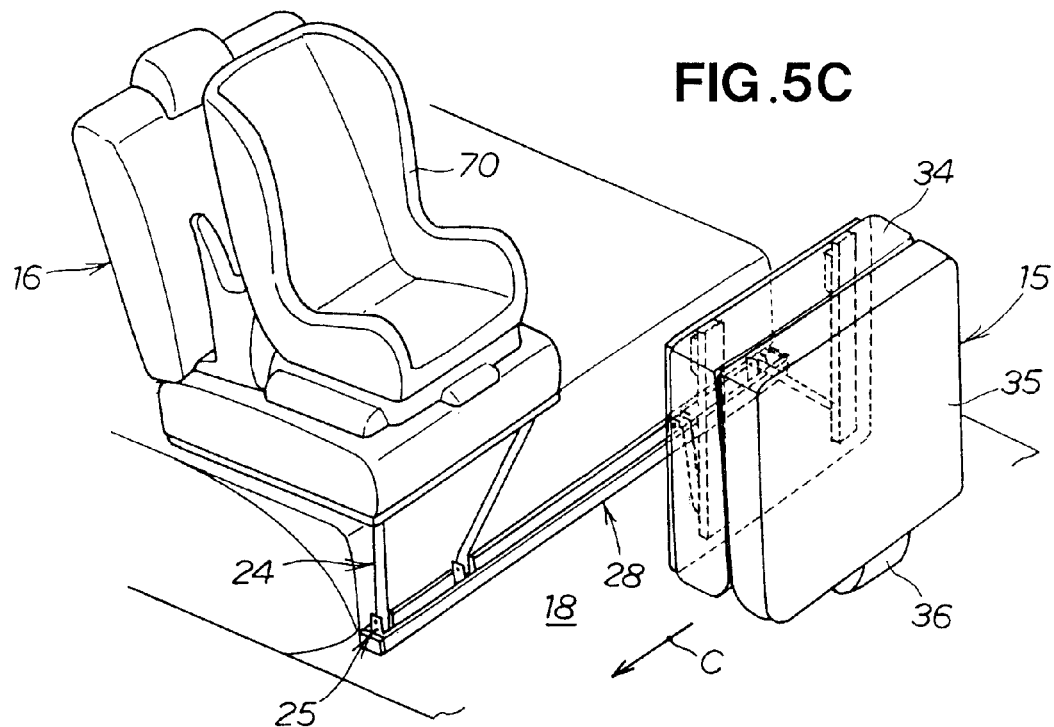
FIG. 5C is a perspective view showing the left rear seat rotated into a left foot space from its position shown in FIG. 5B.
Figure 5D:
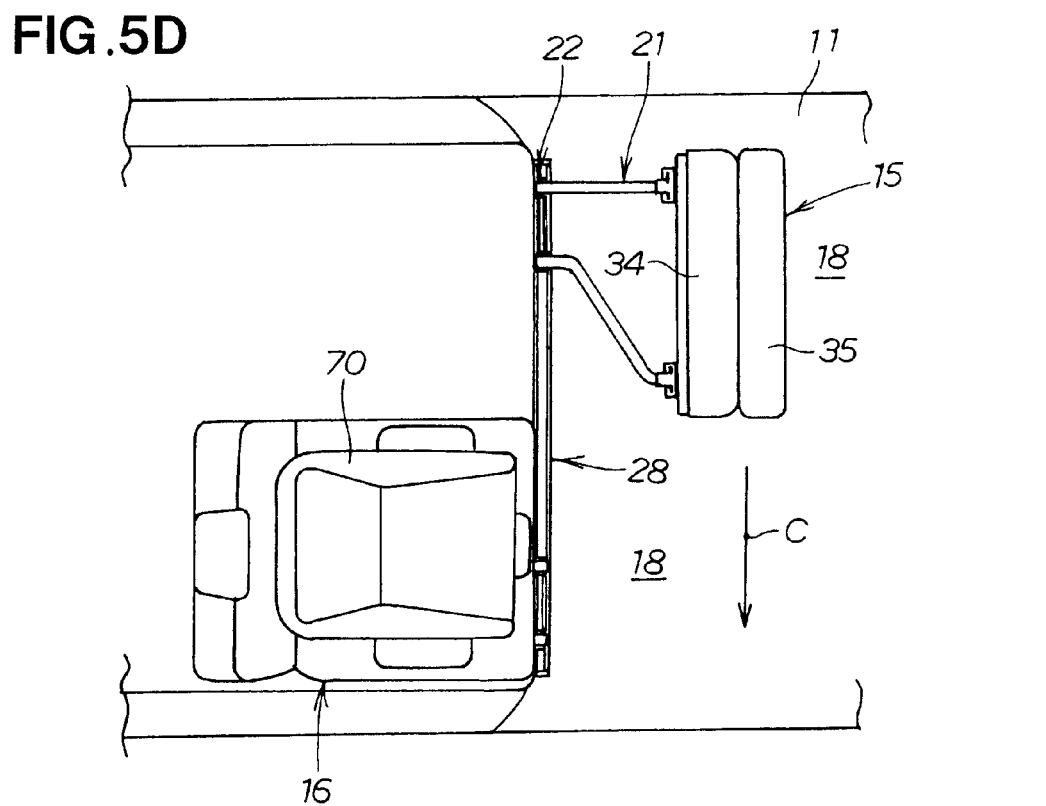
FIG. 5D is a top plan view of the state of FIG. 5C.

As shown in FIGS. 5C and 5D, the left rear seat 15 that has been rotated is slid into the right foot space 18 using the lateral slide rail 28 as indicated by arrow C.

Figure 5E:
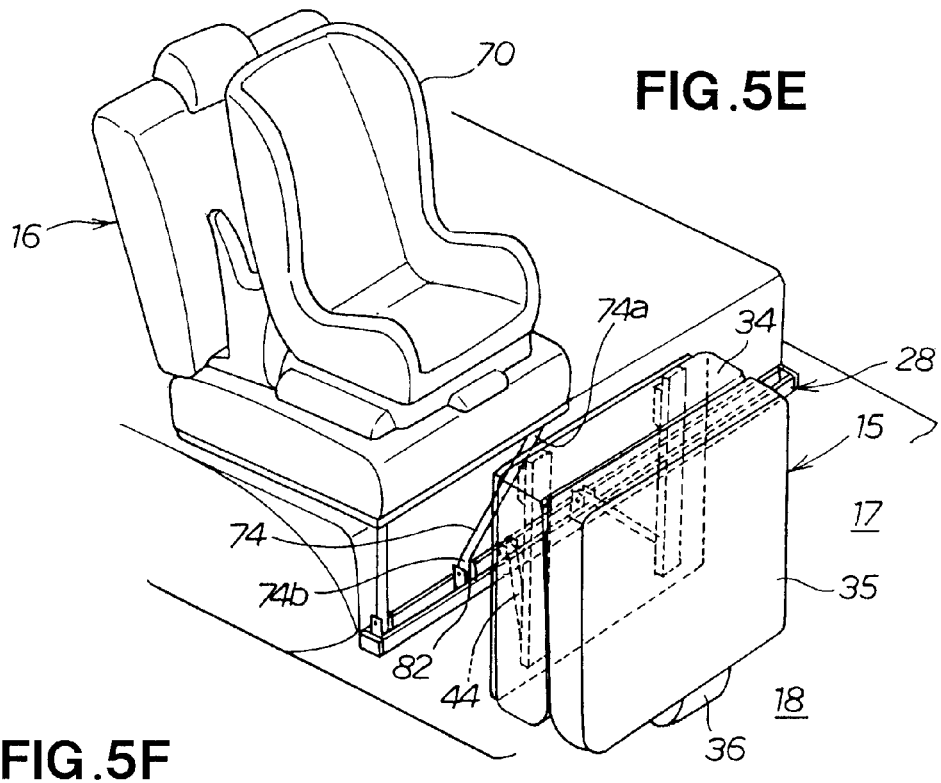
FIG. 5E is a perspective view showing the left rear seat moved into a right foot space from its position shown in FIG. 5C.
Figure 5F:
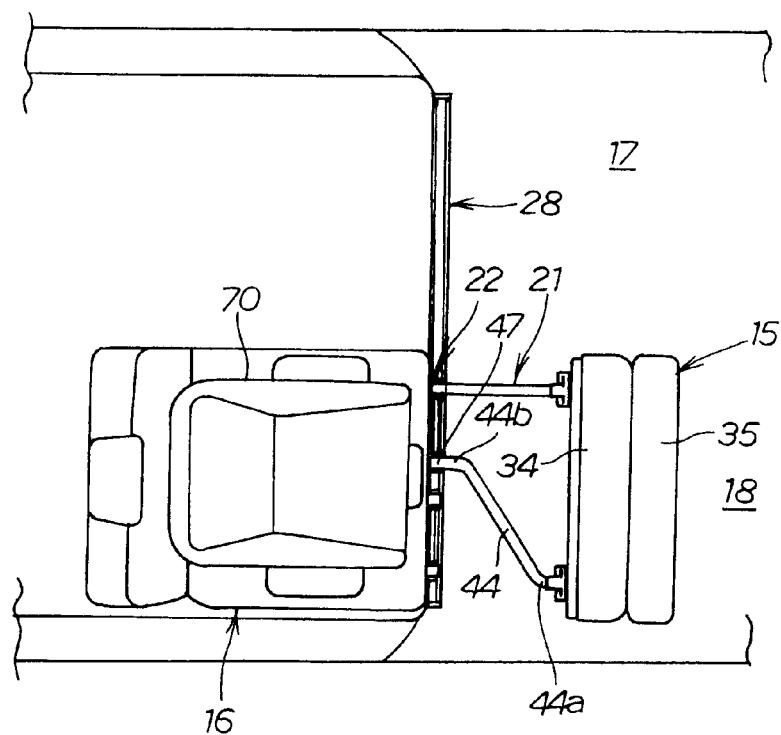
FIG. 5F is a top plan view of the state of FIG. 5E.

As shown in FIGS. 5E and 5F, the left rear seat 15 that has been rotated is arranged in the right foot space 18.

The inner left front leg part 44 of the left rear seat 15 extends in a state of being inclined towards the outer side with respect to the vehicle body from the upper end part 44a to the lower end part 44b. The inner boss part 47 (i.e., the left inner slider 95 of the left moving unit 92 shown in FIG. 4) is thereby positioned at substantially the center of the left rear seat 15 in the vehicle width direction.

The inner right front leg part 74 of the right rear seat 16 extends in a state of being inclined towards the outer side with respect to the vehicle body from an upper end part 74a to a lower end part 74b. The inner boss part 82 (i.e., the right inner slider of the right moving unit; not shown) is thereby positioned at substantially the center of the right rear seat 16 in the vehicle width direction.

The left inner slider 95 of the left moving unit 92 (see FIG. 4) is thereby positioned near the right inner slider of the right moving unit (not shown) when the left rear seat 15 is in a state of being arranged in the right foot space 18. Therefore, it is possible to prevent the left inner slider 95 of the left moving unit 92 from obstructing the right inner slider of the right moving unit.

Figure 5G:
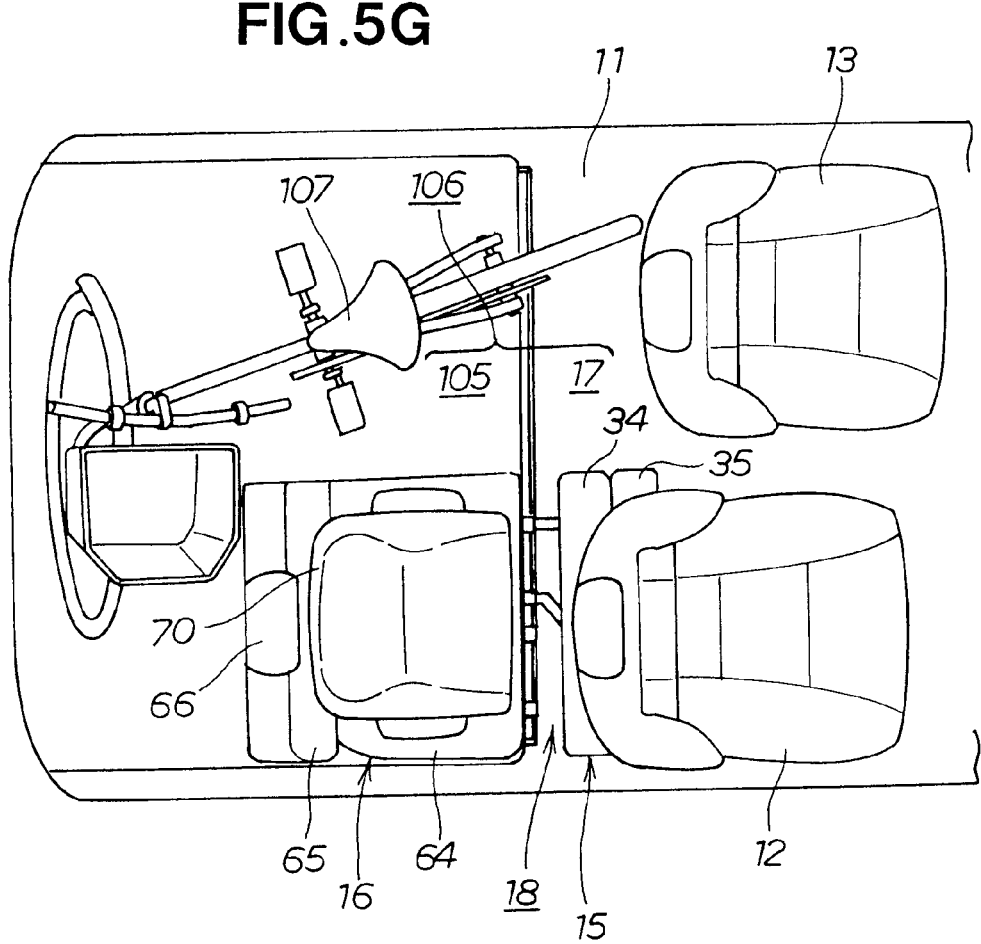
FIG. 5G is a plan view showing an example in which a bicycle is disposed in a load space formed by moving the left rear seat.

As shown in FIG. 5G, moving the left rear seat 15 into the right foot space 18 makes it possible to remove the left rear seat 15 from a space 105 in which the left rear seat 15 is arranged in a seating state, or from the left foot space 17. It is thereby possible to combine the space 105 in which the left rear seat 15 is arranged in the seating state with the left foot space 17 to form the load space 106. A large load space 106 can thereby be provided, and the slide door or the tail gate can be opened and a bicycle 107, a motorcycle, or a similar large-sized load can be disposed in the large load space 106 from each of the openings.

As with the left rear seat 15, the right rear seat 16 can be moved into the right foot space 18, and the right rear seat 16 that has moved into the right foot space 18 can be moved into the left foot space 17. Moving the right rear seat 16 into the left foot space 17 makes it possible to remove the right rear seat 16 from a space in which the right rear seat 16 is arranged in a seating state, or from the right foot space 18. It is thereby possible to combine the space in which the right rear seat 16 is arranged in the seating state and the right foot space 18. A large load space can thereby be provided, and a bicycle 107 (see FIG. 5G), a motorcycle, or a similar large-sized load can be disposed in the large load space.

Thus, it is possible to select, according to the intended use of the vehicle, between an instance in which the left rear seat 15 is removed and a large load space 106 is provided, and an instance in which the right rear seat 16 is removed and a large load space is provided. As a result, there is increased freedom in regard to the layout for providing a load space, and convenience can be improved.

Next, a description will be given for a vehicle seat device 120 according to a second embodiment with reference to FIGS. 6 through 8G. Members according to the second embodiment that are identical or similar to those in the vehicle seat device 10 according to the first embodiment are given the same numerals and a description thereof will not be provided.

Second Embodiment

A description will now be given for the vehicle seat device 120 according to the second embodiment.

Figure 6:
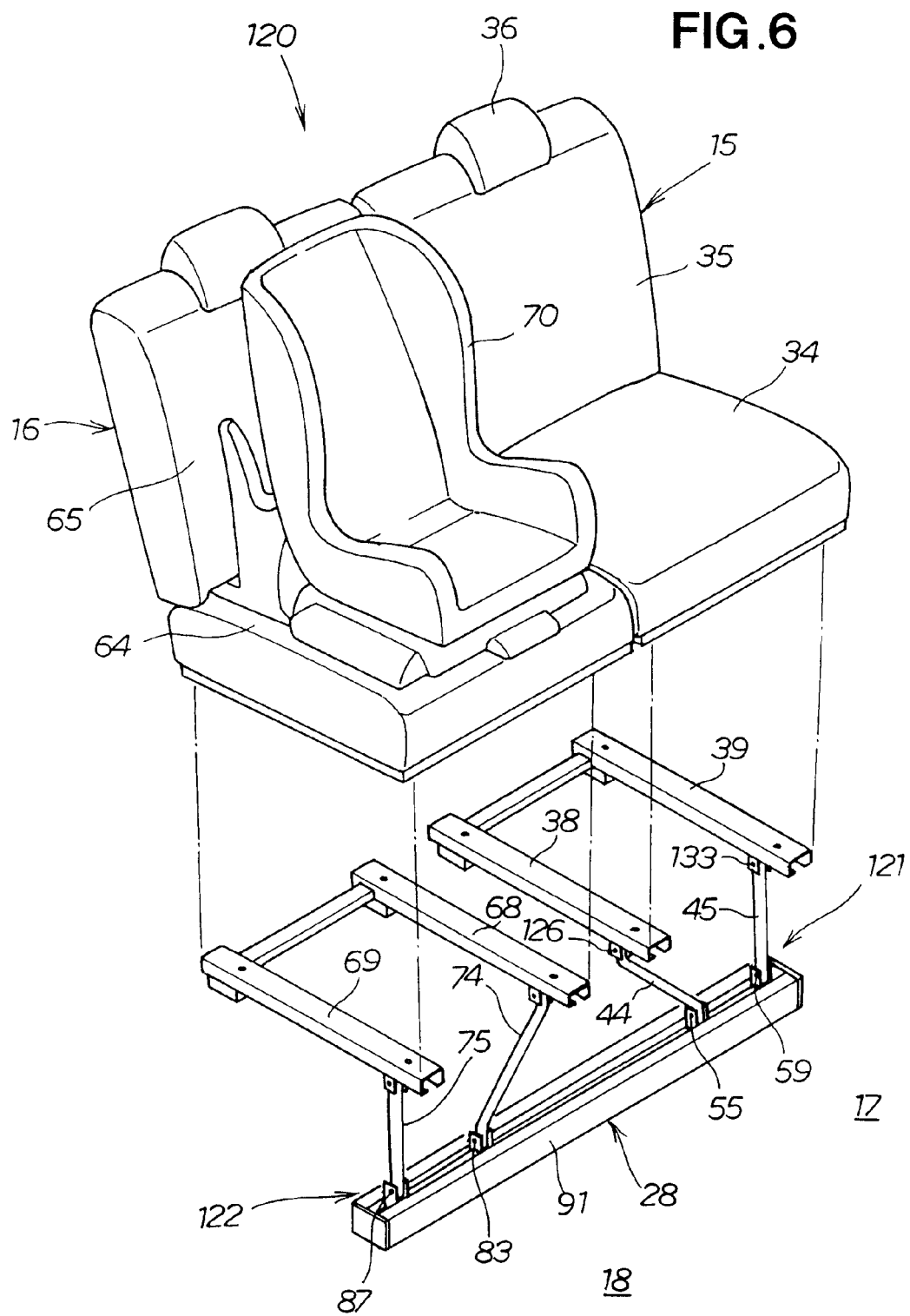
FIG. 6 is an exploded perspective view illustrating a vehicle seat device according to a second embodiment of the present invention.
Figure 7:
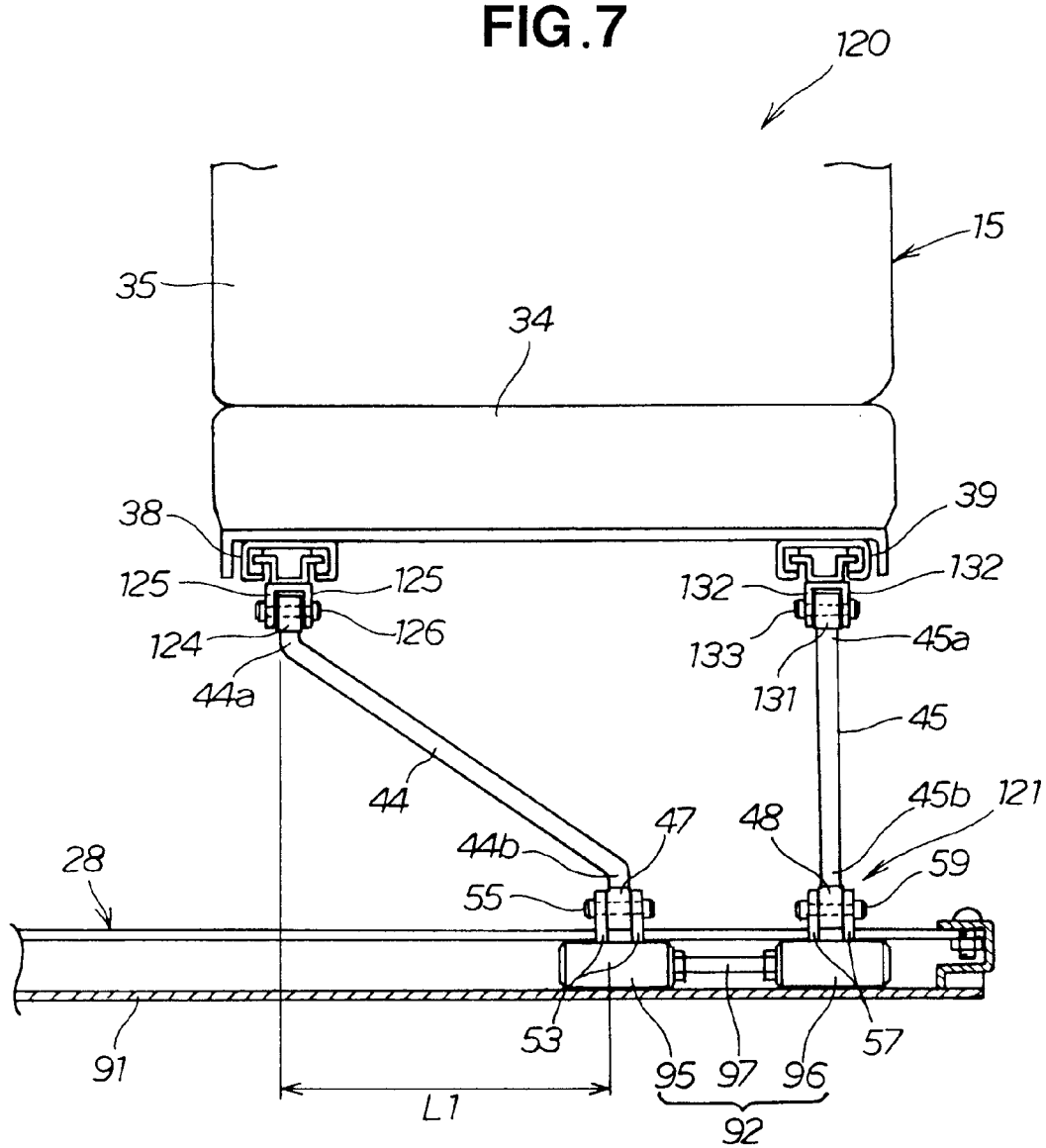
FIG. 7 is a front elevational view showing in cross-section a part of the vehicle seat device of FIG. 6.

As shown in FIGS. 6 and 7, in the vehicle seat device 120 according to the second embodiment, the reference numerals of the left and right front movement means 22, 25 according to the first embodiment have been substituted with 121, 122, and other reference numerals are the same as those for the first embodiment.

As shown in FIG. 7, in the left front movement means 121, the lower end part 44b of the inner left front leg part 44 and the lower end part 45b of the outer left front leg part 45 are provided on the left moving unit 92 so as to be turnable in the longitudinal direction with respect to the vehicle body, and the upper end part 44a of the inner left front leg part 44 and the upper end part 45a of the outer left front leg part 45 are provided on the left rear seat 15 so as to be turnable in the longitudinal direction with respect to the left rear seat 15.

Specifically, as with the first embodiment, the lower end part 44b (i.e., the inner boss part 47) of the inner left front leg part 44 is pivotably supported between the pair of inner brackets 53 by the inner left support pin 55. The upper end part 44a (i.e., an inner upper boss part 124) of the inner left front leg part 44 is pivotably supported between a pair of inner upper brackets 125 by an inner upper left support pin 126.

As with the first embodiment, the lower end part 45b (i.e., the outer boss part 48) of the outer left front leg part 45 is pivotably supported between the pair of outer brackets 57 by the outer left support pin 59. The upper end part 45a (i.e., an outer upper boss part 131) of the outer left front leg part 45 is pivotably supported between a pair of outer upper brackets 132 by an outer upper left support pin 133. The outer upper left support pin 133 and the inner upper left support pin 126 are arranged coaxially in relation to each other.

According to the left front movement means 121, it is possible to turn the inner and outer boss parts 47, 48 about the inner and outer left support pins 55, 59; and turn the inner and outer upper boss parts 124, 131 about the inner and outer upper left support pins 126, 133. The left rear seat 15 comprises the inner and outer left slide rails 38, 39 provided to a lower part of the left seat cushion 34. It is thereby possible to tilt the left seat back 35 of the left rear seat 15 onto the left seat cushion 34; and, in this state, swing the inner and outer left front leg parts 44, 45 forward with respect to the vehicle body and slide the left rear seat 15 forward with respect to the vehicle body using the inner and outer left slide rails 38, 39, whereby the left rear seat 15 is caused to "dive down" into the left foot space 17 (i.e., move in a substantially parallel manner in which the left seat back 35 of the left rear seat 15 is in a state of being disposed on top).

The right front movement means 122 shown in FIG. 6 is bilaterally symmetrical with respect to the left front movement means 121. As with the left front movement means 121, the right front movement means 122 is thereby able to cause the right rear seat 16 to "dive down" into the right foot space 18 (i.e., move in a substantially parallel manner in which the right seat back 65 of the right rear seat 16 is in a state of being disposed on top).

Specifically, it is possible to tilt the right seat back 65 of the right rear seat 16 onto the right seat cushion 64, and in this state, swing the inner and outer right front leg parts 74, 75 forward with respect to the vehicle body and slide the right rear seat 16 forward with respect to the vehicle body using the inner and outer right slide rails 68, 69, whereby the right seat cushion 64 is caused to "dive down" into the right foot space 18.

Next, a description will be given for an example in which the left rear seat 15 is moved into the right foot space 18 with reference to FIGS. 8A through 8G.

Figure 8A:
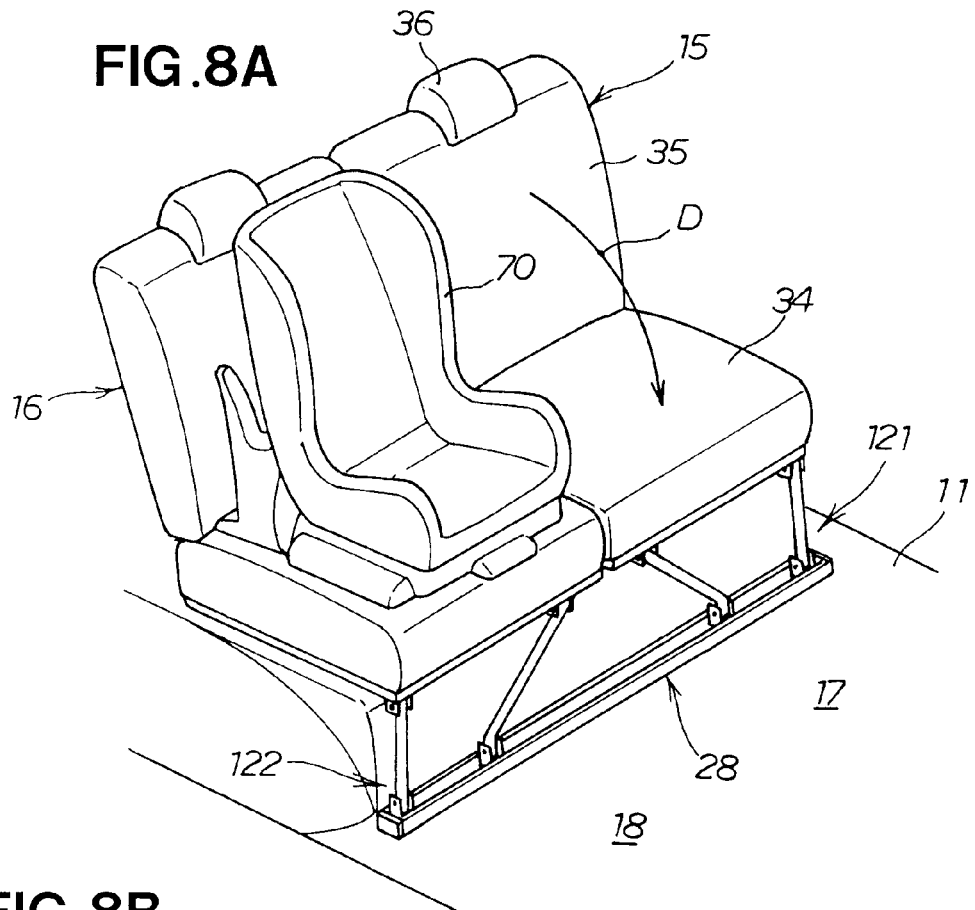
FIG. 8A is a perspective view showing left and right rear seats according to the second embodiment.

As shown in FIG. 8A, the left seat back 35 of the left rear seat 15 is tilted onto the left seat cushion 34 as indicated by arrow D.

Figure 8B:
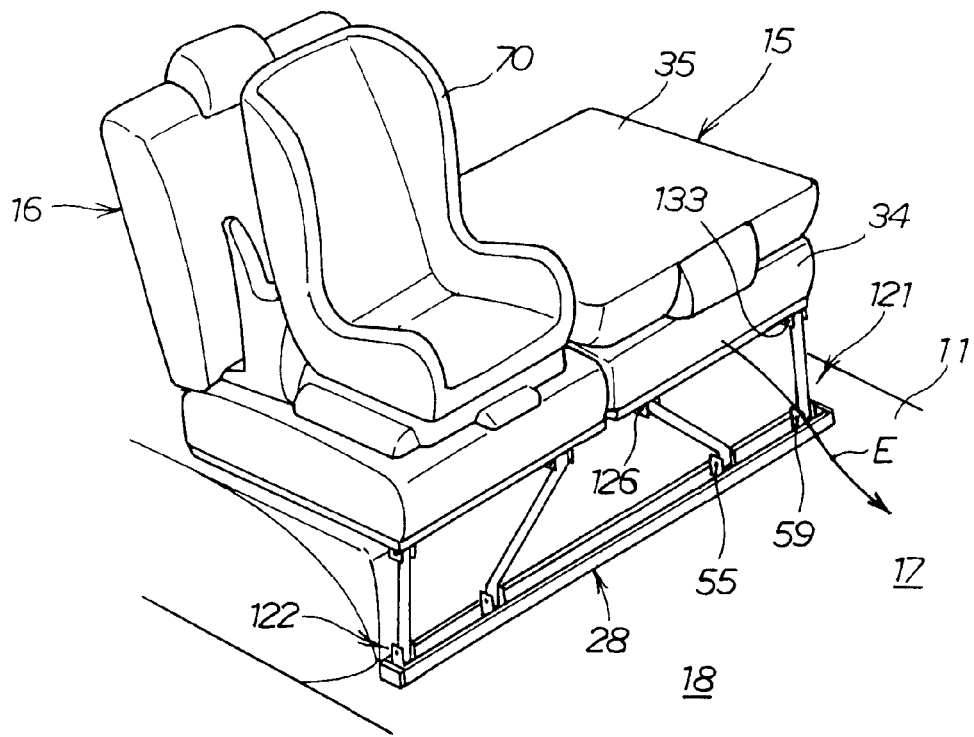
FIG. 8B is a perspective view showing a left rear seat with its seat back collapsed from the state of FIG. 8A.

As shown in FIG. 8B, the left seat back 35 is folded down onto the left seat cushion 34. The left rear seat 15 having the left seat back 35 folded down can be caused to "dive down" (i.e., moved in a substantially parallel manner in which the left seat back 35 of the left rear seat 15 is in a state of being disposed on top) towards the left foot space 17 as indicated by arrow E.

Figure 8C:
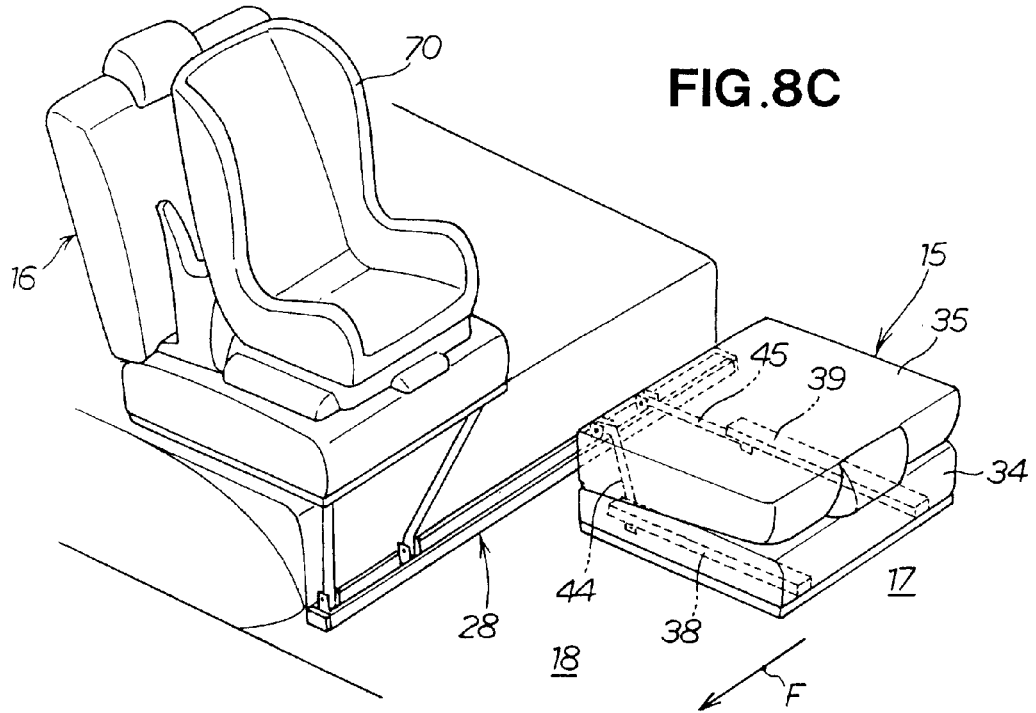
FIG. 8C is a perspective view showing the left rear seat moved into the left foot space from the state shown in FIG. 8B.
Figure 8D:
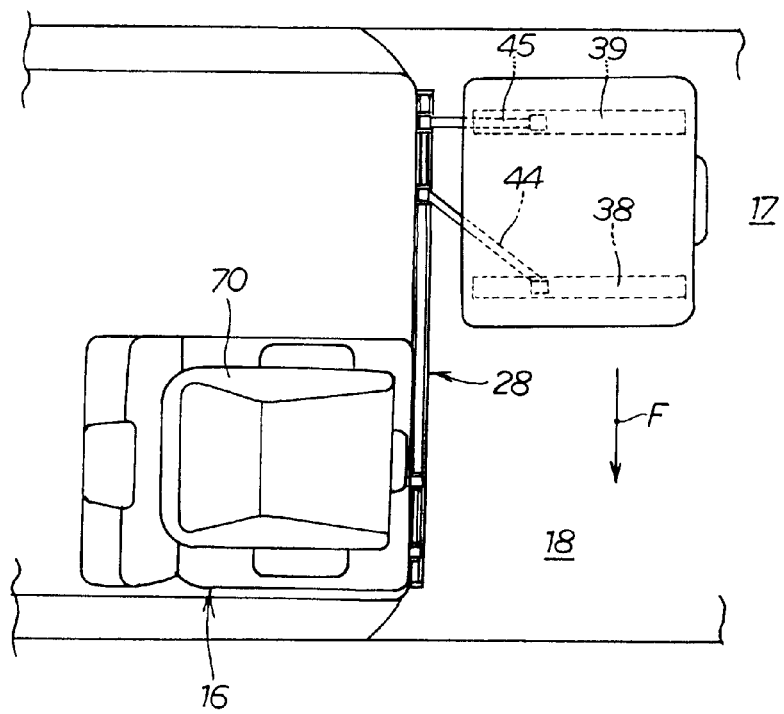
FIG. 8D is a top plan view showing the state of FIG. 8C.

As shown in FIGS. 8C and 8D, the left rear seat 15, which has been caused to "dive down," is slid into the right foot space 18 using the lateral slide rail 28 as indicated by arrow F.

Figure 8E:
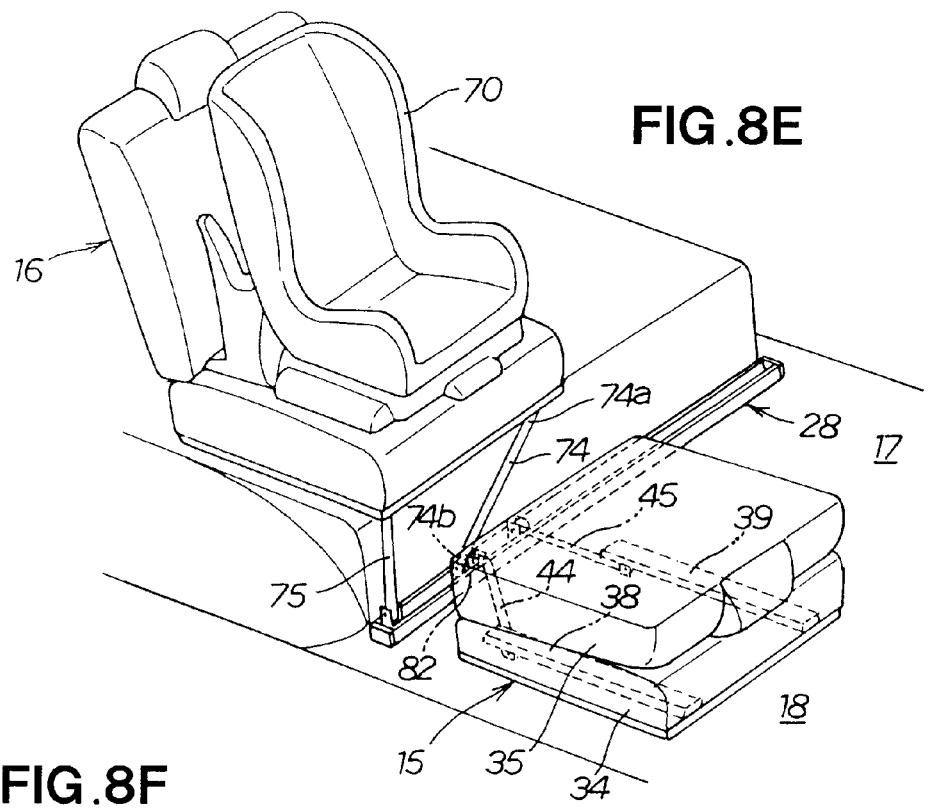
FIG. 8E is a perspective view showing the left rear seat moved into the right foot space from the state of FIG. 8C.
Figure 8F:
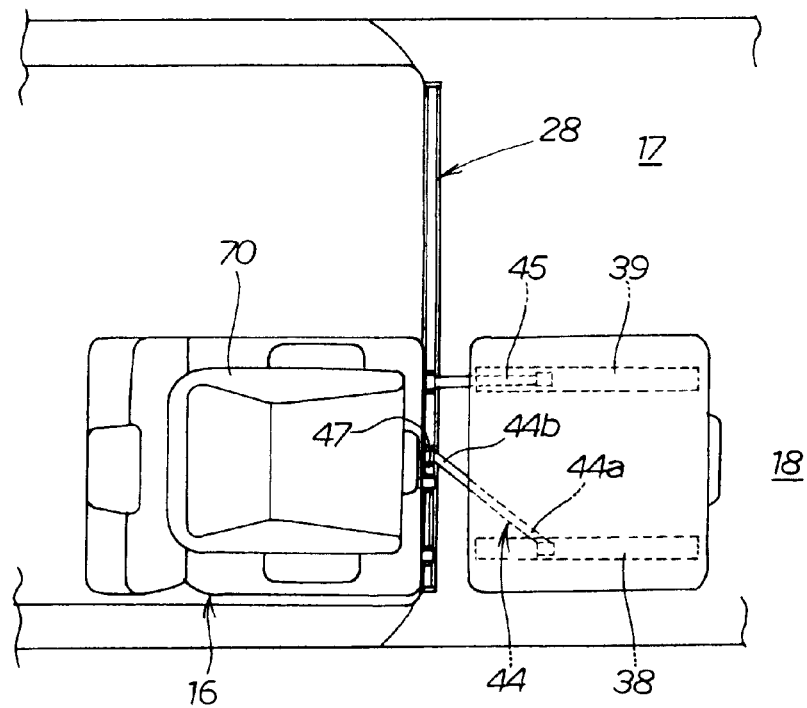
FIG. 8F is a top plan view showing the state of FIG. 8E.

As shown in FIGS. 8E and 8F, the left rear seat 15, which has been caused to "dive down," is positioned in the right foot space 18.

The inner left front leg part 44 of the left rear seat 15 extends in a state of being inclined towards the outer side with respect to the vehicle body from an upper end part 44a to a lower end part 44b. The inner boss part 47 (i.e., the left inner slider 95 of the left moving unit 92) is thereby positioned at substantially the center of the left rear seat 15 in the vehicle width direction.

The inner right front leg part 74 of the right rear seat 16 extends in a state of being inclined towards the outer side with respect to the vehicle body from an upper end part 74a to a lower end part 74b. The inner boss part 82 (i.e., the right inner slider of the right moving unit; not shown) is thereby positioned at substantially the center of the right rear seat 16 in the vehicle width direction.

The left inner slider 95 of the left moving unit 92 (see FIG. 7) is thereby positioned near the right inner slider of the right moving unit (not shown) when the left rear seat 15 is in a state of being arranged in the right foot space 18. Therefore, the left inner slider 95 of the left moving unit 92 does not obstruct the right inner slider of the right moving unit.

Figure 8G:
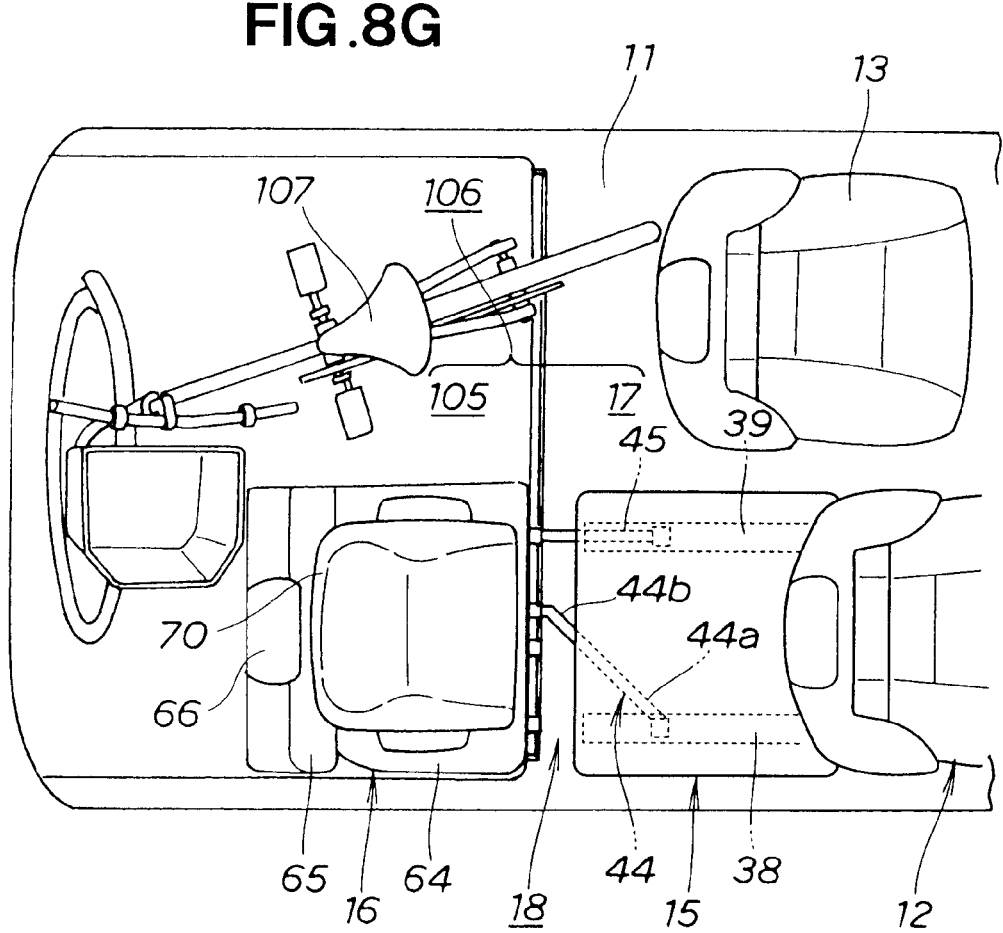
FIG. 8G is a top plan view showing an example in which a bicycle is disposed in a load space formed by moving the left rear seat in accordance with the second embodiment.

As shown in FIG. 8G, moving the left rear seat 15 into the right foot space 18 makes it possible to remove the left rear seat 15 from a space 105 in which the left rear seat 15 is arranged in a seating state, or from the left foot space 17. It is thereby possible to combine the space 105 in which the left rear seat 15 is arranged in the seating state with the left foot space 17 to form the load space 106. A large load space 106 can thereby be provided, and the slide door or the tail gate can be opened and a bicycle 107, a motorcycle, or a similar large-sized load can be disposed in the large load space 106 from each of the openings.

As with the left rear seat 15, the right rear seat 16 can be moved into the right foot space 18, and the right rear seat 16 that has moved into the right foot space 18 can be moved into the left foot space 17. Moving the right rear seat 16 into the left foot space 17 makes it possible to remove the right rear seat 16 from a space in which the right rear seat 16 is arranged in a seating state, or from the right foot space 18. It is thereby possible to combine the space in which the right rear seat 16 is arranged in the seating state and the right foot space 18. A large load space can thereby be provided, and a bicycle 107, a motorcycle, or a similar large-sized load can be disposed in the large load space.

Thus, it is possible to select, according to the intended use of the vehicle, between an instance in which the left rear seat 15 is removed and a large load space 106 is provided, and an instance in which the right rear seat 16 is removed and a large load space is provided. As a result, there is increased freedom in regard to the layout for providing a load space, and convenience can be improved.

The vehicle seat devices 10, 120 according to the present invention are not limited to those shown in the first and the second embodiments described above, and may be modified or improved as appropriate. For example, in the first and the second embodiments, the lateral slide rail 28 is described as an example of the vehicle-width-direction movement means; however, the vehicle-width-direction movement means is not limited to the lateral slide rail 28. A guide groove or other means may also be used as the vehicle-width-direction movement means.

The shape or configuration of the vehicle seat devices 10, 120; the vehicle body floor 11; the left second seat 15; the right second seat 16; the left foot space 17; the right foot space 18; the left front movement means 22, 121; the right front movement means 25, 122; the lateral slide rail 28; the left front support leg 41; the right front support leg 71; and other components shown in the first and second embodiments are not limited to those shown as examples, and may be modified as appropriate.

Industrial Applicability

The present invention is suitable for application in a motor vehicle comprising a vehicle seat in which a first seat and a second seat are arranged next to each other in the vehicle width direction, wherein the first seat can be moved by front movement means to a foot space in front.

Reference Signs List

- 10, 120 Vehicle seat device
- 11 Vehicle body floor
- 15 Left rear seat (first seat)
- 16 Right rear seat (second seat)
- 17 Left foot space (foot space)
- 18 Right foot space (foot space)
- 22, 121 Left front movement means (front movement means)
- 25, 122 Right front movement means (front movement means)
- 28 Lateral slide rail (vehicle-width-direction movement means)
- 41 Left front support leg (first support leg)
- 71 Right front support leg (second support leg)

The invention claimed is:

1. A vehicle seat device comprising:
   first and second seats arranged next to each other in a vehicle-width direction;
   a front movement device for moving the first seat to a foot space positioned in front of the first seat; and
   a vehicle-width-direction movement device for allowing the first seat, that has moved into the foot space, to move to a foot space positioned in front of the second seat,
   wherein the vehicle-width-direction movement device comprises a slide rail provided on a vehicle body floor along the vehicle-width direction from the foot space of the first seat to the foot space of the second seat,
   said slide rail being configured to receive first and second seat supports so as to enable said seats to slidably move in the vehicle width direction, said first seat support includes a first moving unit and said second seat support includes a second moving unit, said first and second moving unit slidably provided in the slide rail,
   the first seat support further comprises
   an inner front leg part and an outer front leg part for supporting the first seat,
   the inner front leg part extends so as to be inclined externally of the vehicle body in the vehicle-width direction from an upper end part to a lower end part thereof and is supported at the lower end part by the first moving unit on the slide rail for movement in the vehicle-width direction and
   the first seat support is received by the slide rail and supports the first seat for frontward rotation with respect to the vehicle body floor; and,
   wherein after said first seat has been rotated frontward via the first seat support, said inclined inner front leg part is configured to allow the first seat to be slidably moved into the foot space in front of the second seat without the first seat interfering with the second seat.

2. The vehicle seat device of claim 1, wherein the second seat support for supporting the second seat allows frontward rotation with respect to the vehicle body floor, and the second seat support is supported by said second moving unit on the slide rail so as to be capable of moving in the vehicle-width direction.

3. The vehicle seat device of claim 1, wherein the first moving unit comprises:
   an inner slider provided with a pair of inner brackets; an outer slider provided with a pair of outer brackets; and a connection rod for coaxially connecting the inner slider and the outer slider, and the first seat support is swingably supported on the brackets by a support pin.

4. The vehicle seat device of claim 2, wherein the second moving unit comprises:
   an inner slider provided with a pair of inner brackets; an outer slider provided with a pair of outer brackets; and a connection rod for coaxially connecting the inner slider and the outer slider, and the second seat support is swingably supported on the brackets by a support pin.

* * * * *